US008239353B2

(12) United States Patent
Yamagishi

(10) Patent No.: US 8,239,353 B2
(45) Date of Patent: Aug. 7, 2012

(54) TRANSMISSION SYSTEM AND METHOD, TRANSMISSION APPARATUS AND METHOD, RECEPTION APPARATUS AND METHOD, AND RECORDING MEDIUM

(75) Inventor: Yasuaki Yamagishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 480 days.

(21) Appl. No.: 12/201,489

(22) Filed: Aug. 29, 2008

(65) Prior Publication Data

US 2009/0063510 A1 Mar. 5, 2009

(30) Foreign Application Priority Data

Aug. 31, 2007 (JP) ................................. 2007-226468

(51) Int. Cl.
*G06F 7/00* (2006.01)
(52) U.S. Cl. ........ 707/693; 707/687; 707/695; 709/201; 709/219
(58) Field of Classification Search .................. 707/693, 707/687; 709/201, 219
See application file for complete search history.

(56) References Cited

U.S. PATENT DOCUMENTS

| 2004/0064481 | A1* | 4/2004 | Azami | 707/104.1 |
| 2008/0077634 | A1* | 3/2008 | Quakenbush | 707/204 |

FOREIGN PATENT DOCUMENTS

| JP | 2002-112208 | 4/2002 |
| JP | 2005-275503 | 10/2005 |
| JP | 2005-285089 | 10/2005 |
| JP | 2005-352813 | 12/2005 |
| WO | WO 03/028293 A1 | 4/2003 |

OTHER PUBLICATIONS

European Patent Office Search Report for European Patent Application No. 08252573.4-1522, Feb. 11, 2009, 7 pages.
Yamagishi, Y., "Metadata Section Draft for WG6 Working Document," Telecommunications Standardization Sector, Focus Group on IPTV, FG IPTV-C-0578, 4$^{th}$ FG IPTV meeting, Slovenia, May 7-11, 2007, 10 pages.
Yamagishi, Y., "Updated Working Document: IPTV Metadata (FG IPTV-DOC-0099)," Telecommunications Standardization Sector, Focus Group on IPTV, FG IPTV-C-0766, 5$^{th}$ FG IPTV meeting, Geneva, Jul. 23-31, 2007, 20 pages.

(Continued)

*Primary Examiner* — Don Wong
*Assistant Examiner* — Tuan-Khanh Phan
(74) *Attorney, Agent, or Firm* — Finnegan, Henderson, Farabow, Garrett & Dunner, L.L.P.

(57) ABSTRACT

A transmission system includes a transmission apparatus transmitting metadata relating to content via a network and a reception apparatus receiving the metadata. The transmission apparatus includes storing metadata including fragment updating management information in units of fragments; generating a delivery unit including a document which includes the metadata contained in fragments excluding the fragment updating management information; compressing the metadata in the delivery unit; adding document updating management information to the compressed metadata; and delivering the delivery unit. The reception apparatus includes receiving the compressed metadata; decompressing the compressed metadata; storing the decompressed metadata; and copy the document updating management information contained in the delivery unit and assign the document updating management information to the fragments as fragment updating management information.

16 Claims, 15 Drawing Sheets

OTHER PUBLICATIONS

Yamagishi, Y., "Working Document: IPTV Metadata (FG IPTV-DOC-0099)," Telecommunications Standardization Sector, Focus Group on IPTV, FG IPTV-C-131, 5$^{th}$ FG IPTV meeting, Geneva, Jul. 23-31, 2007, 17 pages.

Kang, K. et al., "Metadata Broadcasting for Personalized Service: A Practical Solution," ETRI Journal, vol. 26, No. 5, Oct. 2004, 15 pages.

Niedermeier, U. et al. "An MPEG-7 tool for compression and streaming of XML data," Proceedings of IEEE International Conference on Multimedia and Expo, Aug. 26-29, 2002, vol. 1, pp. 521-524, 4 pages.

Office Action from the Japanese Patent Office for Japaneses Patent Application 2007-226468 mailed Apr. 24, 2012, pp. 1-3.

* cited by examiner

FIG. 4

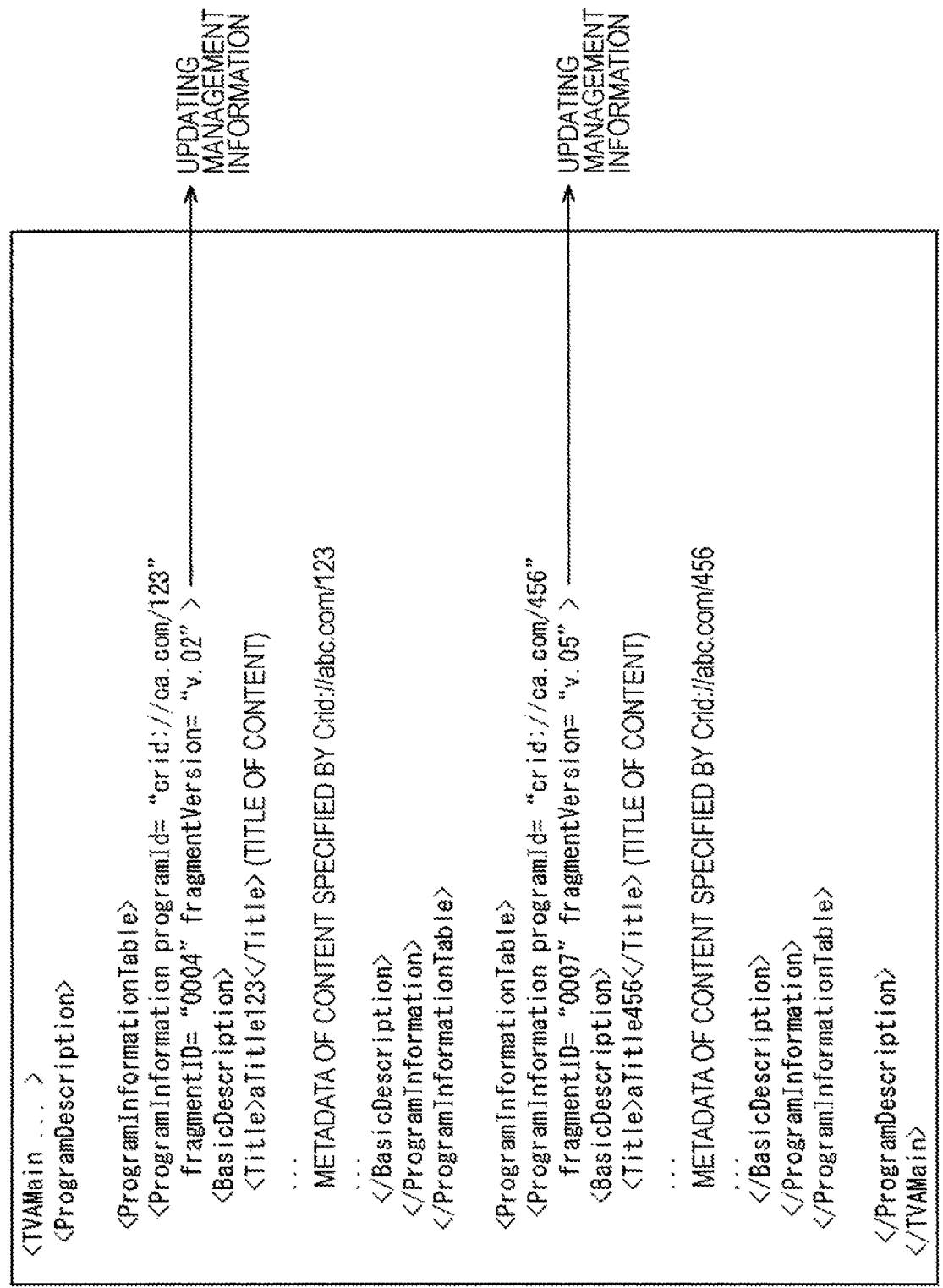

```
<TVAMain ... >
<ProgramDescription>

<ProgramInformationTable>
<ProgramInformation programId= "crid://ca.com/123"
    fragmentID= "0004" fragmentVersion= "v.02" >    ——→ UPDATING MANAGEMENT INFORMATION
<BasicDescription>
<Title>aTitle123</Title> (TITLE OF CONTENT)

METADATA OF CONTENT SPECIFIED BY Crid://abc.com/123

</BasicDescription>
</ProgramInformation>
</ProgramInformationTable>

<ProgramInformationTable>
<ProgramInformation programId= "crid://ca.com/456"
    fragmentID= "0007" fragmentVersion= "v.05" >    ——→ UPDATING MANAGEMENT INFORMATION
<BasicDescription>
<Title>aTitle456</Title> (TITLE OF CONTENT)

METADATA OF CONTENT SPECIFIED BY Crid://abc.com/456

</BasicDescription>
</ProgramInformation>
</ProgramInformationTable>

</ProgramDescription>
</TVAMain>
```

FIG. 5

```
<TVAMain ... fragmentID= "0002" fragmentVersion= "v.08" >     → UPDATING MANAGEMENT INFORMATION
<ProgramDescription>

<ProgramInformationTable>
<ProgramInformation programId= "crid://ca.com/123" >
<BasicDescription>
<Title>aTitle123</Title>(TITLE OF CONTENT)

METADATA OF CONTENT SPECIFIED BY Crid://abc.com/123
...
</BasicDescription>
</ProgramInformation>
</ProgramInformationTable>

<ProgramInformationTable>
<ProgramInformation programId= "crid://ca.com/456" >
<BasicDescription>
<Title>aTitle456</Title>(TITLE OF CONTENT)

METADATA OF CONTENT SPECIFIED BY Crid://abc.com/456
...
</BasicDescription>
</ProgramInformation>
</ProgramInformationTable>

</ProgramDescription>
</TVAMain>
```

FIG. 6

```
<schema xmlns:tva="urn:tva:metadata:2006/03" (NAMESPACE IDENTIFYING ORIGINAL TV-Anytime METADATA)
        xmlns="http://www.w3.org/2001/XMLSchema" (NAMESPACE IDENTIFYING XML SCHEMA)
        targetNamespace="urn:iptv" ... > (DECLARATION THAT NEWLY IDENTIFIED SCHEMA IS IDENTIFIED BY "urn:iptv")
<complexType name="TVAMainType"> (DEFINITION OF TVAMainType, WHICH IS EXTENDED ROOT ELEMENT)
  <complexContent>
    <extension base="tva:TVAMainType"> (SPECIFICATION OF ORIGINAL TV-Anytime ROOT ELEMENT SERVING AS EXTENSION BASE)
      <attributeGroup ref="tva:fragmentIdentification"/> (DEFINITION OF fragmentIdentification, WHICH IS ATTRIBUTE TO BE ADDED)
    </extension>
  </complexContent>
</complexType>
<attributeGroup name="fragmentIdentification">
  <attribute name="fragmentId" type="tva:TVAIDType" use="optional"/>
  <attribute name="fragmentVersion" type="unsignedLong" use="optional"/>
  <attribute name="fragmentExpirationDate" type="dateTime" use="optional"/>
</attributeGroup>
</schema>
```

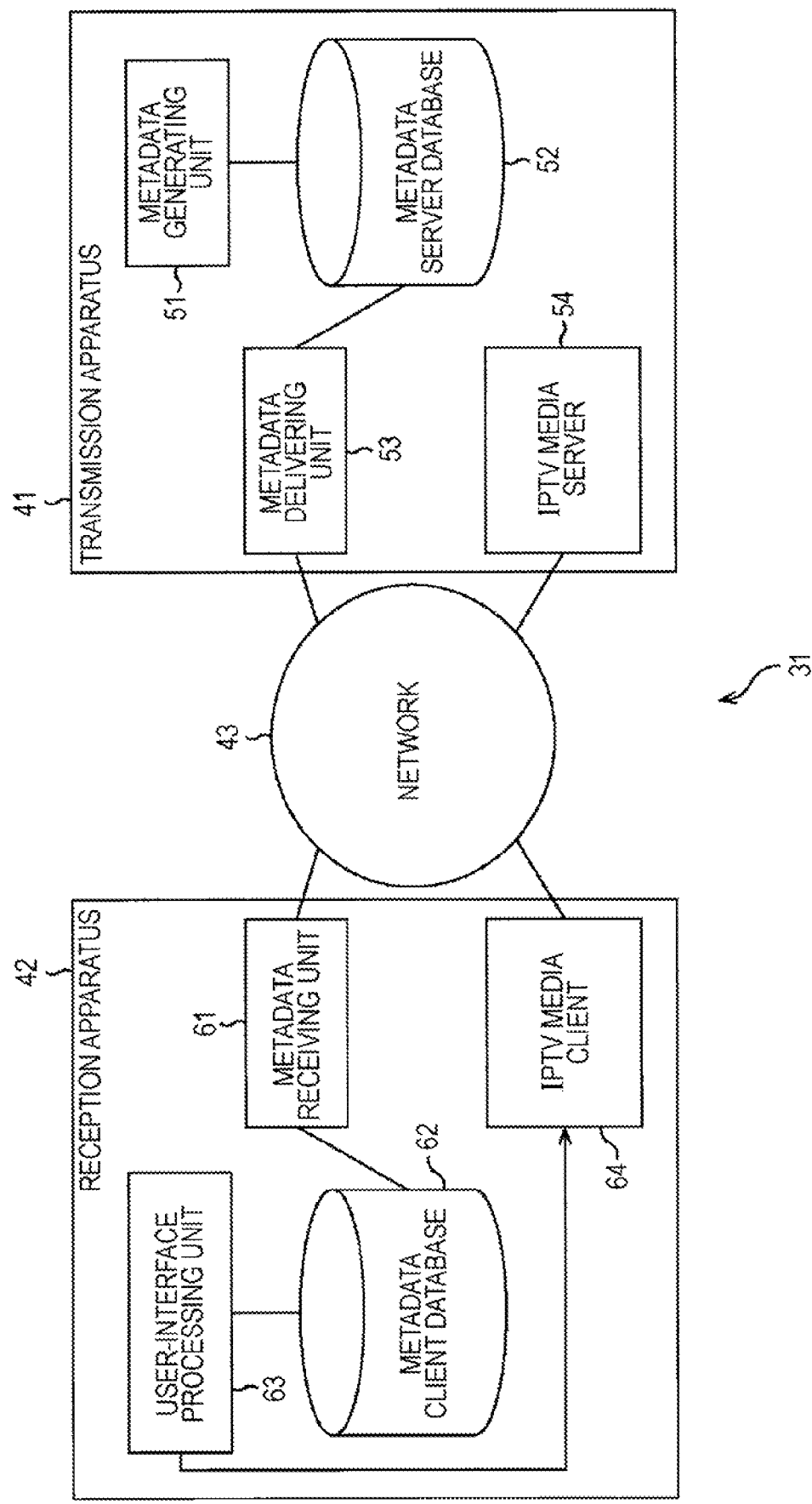

FIG. 17

```
<schema xmlns:tva="urn:tva:metadata:2006/03" (NAMESPACE IDENTIFYING ORIGINAL TV-Anytime METADATA)
        xmlns="http://www.w3.org/2001/XMLSchema" (NAMESPACE IDENTIFYING XML SCHEMA)
        targetNamespace="urn:iptv" ... >(DECLARATION THAT NEWLY IDENTIFIED SCHEMA IS IDENTIFIED BY "urn:iptv")
 <complexType name="MetadataEncapsulationType">
         (DEFINITION OF HEADER OF FILE STORING TV-Anytime METADATA DOCUMENT)
  <complexContent>
   <sequence>
    <element base="tva:TVAMainType"> (TV-Anytime ROOT ELEMENT)
   </sequence>
   <attributeGroup ref="tva:fragmentIdentification"/>(DEFINITION OF fragmentIdentification, WHICH IS ATTRIBUTE TO BE ADDED)
  </complexContent>
 </complexType>
 <attributeGroup name="fragmentIdentification">
  <attribute name="fragmentId" type="tva:TVAIDType" use="optional"/>
  <attribute name="fragmentVersion" type="unsignedLong" use="optional"/>
  <attribute name="fragmentExpirationDate" type="dateTime" use="optional"/>
 </attributeGroup>
</schema>
```

FIG. 18

```
<MetadataEncapsulationType fragmentID= "0002" fragmentVersion= "v.08" >

<TVAMain>
 <ProgramDescription>

<ProgramInformationTable>
   <ProgramInformation programId= "crid://ca.com/123" >
    <BasicDescription>
     <Title>aTitle123</Title>(TITLE OF CONTENT)
      ...
       METADATA OF CONTENT SPECIFIED BY Crid://abc.com/123
      ...
    </BasicDescription>
   </ProgramInformation>
  </ProgramInformationTable>

<ProgramInformationTable>
   <ProgramInformation programId= "crid://ca.com/456" >
    <BasicDescription>
     <Title>aTitle456</Title>(TITLE OF CONTENT)
      ...
       METADATA OF CONTENT SPECIFIED BY Crid://abc.com/456
      ...
    </BasicDescription>
   </ProgramInformation>
  </ProgramInformationTable>

</ProgramDescription>
</TVAMain>

</MetadataEncapsulationType>
```

TRANSMISSION SYSTEM AND METHOD, TRANSMISSION APPARATUS AND METHOD, RECEPTION APPARATUS AND METHOD, AND RECORDING MEDIUM

CROSS REFERENCES TO RELATED APPLICATIONS

The present invention contains subject matter related to Japanese Patent Application JP 2007-226468 filed in the Japanese Patent Office on Aug. 31, 2007, the entire contents of which are incorporated herein by reference.

FIELD OF THE INVENTION

The present disclosure relates to transmission systems and methods, transmission apparatuses and methods, reception apparatuses and methods, and recording media, specifically, to a transmission system and method for transmitting metadata without placing a large load on a transmission apparatus, a transmission apparatus and method, a reception apparatus and method, and a recording medium.

BACKGROUND OF THE INVENTION

Transmitting content via the Internet has been proposed in recent years. Metadata, which is information necessary for users to select content, is additionally transmitted via the Internet (for example, see Japanese Unexamined Patent Application Publication No. 2005-275503).

In some cases, a person who is transmitting metadata will desire to update the metadata. It is thus necessary to deliver the latest metadata to users. When a person who is transmitting metadata performs an update to the metadata, the updated information is sent to each user, and each user in turn updates stored metadata to the latest metadata.

In order to manage updating so that the metadata can be reliably updated, information for identifying the updated metadata and information on the updated details are necessary. One of metadata standard specifications developed by the TV-Anytime Forum, an association of organizations including broadcasters, telecommunications service providers, manufacturers, and content providers and which seek to standardize specifications in Japan, is the Association of Radio Industries and Businesses (AIRB)-B38. In this standard, the smallest unit that can be updated is called a "fragment". An updated unit is specified using an identifier and version information assigned to each fragment.

That is, as shown in FIG. 1, a metadata table entry serving as a fragment represented by data from the tag <ProgramInformation to the tag </ProgramInformation> contains updating management information, namely, fragmentID=xxx serving as an identifier and fragmentVersion=yyy serving as version information.

Upon receipt of a request made by a user to transmit metadata, a transmission apparatus serving as a metadata transmission source compresses the metadata, excluding updating management information, on a fragment-by-fragment basis, adds the updating management information to each of the compressed fragments, and transmits the compressed fragments or metadata containing the updating management information to a reception apparatus. The reception apparatus decompresses the received metadata and stores the decompressed metadata corresponding to the updating management information. In order to transmit metadata in an efficient manner, the transmission apparatus compresses in advance the metadata in units of fragments, adds updating management information to the compressed metadata, and stores the compressed metadata containing the updating management information.

When the metadata is updated, the transmission apparatus adds updating management information to the compressed, updated fragments and transmits the fragments or metadata containing the updating management information to the reception apparatus. The reception apparatus searches the stored metadata for metadata corresponding to the received updating management information. If the reception apparatus has stored the corresponding metadata, the reception apparatus decompresses the metadata and updates the stored metadata to the decompressed metadata.

The management updating information can be transmitted in a compressed form. However, when the updating management information has been compressed, the reception apparatus can perform an updating process only after the reception apparatus has decompressed the entire data received, resulting in a reduction in efficiency of updating a database.

For example, referring to FIG. 2, if a plurality of fragments (metadata table entries) exist, updating management information (FragmentManagementInfo) is added to each fragment. As a result, even when one of the fragments is modified by a minor amount, only the modified fragment can be reliably updated.

Furthermore, the TV-Anytime Forum specifications can only identify metadata on a fragment-by-fragment basis. When multiple fragments are updated, the transmission apparatus must repeat the process of compressing metadata in units of fragments and adding corresponding updating management information to the fragments for the number of updated fragments. As a result, a large compression load is placed on the transmission apparatus.

It is accordingly a primary object of the present disclosure to transmit metadata without placing a large load on a transmission apparatus, and prevent the reduction of efficiency of updating stored metadata.

SUMMARY OF THE INVENTION

One aspect of the disclosure is directed to a transmission system. The transmission system may include a transmission apparatus which may be configured to transmit metadata relating to content via a network, and a reception apparatus which may be configured to receive the metadata transmitted from the transmission apparatus. The transmission apparatus may include means for storing the metadata including fragment updating management information in units of fragments, means for constructing a document from the metadata contained in a plurality of fragments excluding the fragment updating management information and generating a delivery unit including the document, means for compressing the metadata contained in the delivery unit, means for adding document updating management information to the compressed metadata contained in the delivery unit, and means for delivering via the network the delivery unit containing the compressed metadata and the document updating management information. The reception apparatus may include means for receiving the compressed metadata contained in the delivery unit, means for decompressing the received compressed metadata, means for storing the decompressed metadata, and means for copying the document updating management information contained in the delivery unit and assigning the document updating management information to the fragments as fragment updating management information.

Another aspect of the disclosure is directed to a transmission method for a transmission system. The method may include transmitting metadata relating to content from a transmission apparatus to a reception apparatus via a network, which may include the steps of, using the transmission apparatus, storing the metadata including fragment updating management information in units of fragments, constructing a document from the metadata contained in a plurality of fragments excluding the fragment updating management information, generating a delivery unit including the document, compressing the metadata contained in the delivery unit, adding document updating management information to the compressed metadata contained in the delivery unit, and delivering, via the network, the delivery unit containing the compressed metadata and the document updating management information, and using the reception apparatus, receiving the compressed metadata contained in the delivery unit, decompressing the received compressed metadata, storing the decompressed metadata, copying the document updating management information contained in the delivery unit, and assigning the document updating management information to the fragments as fragment updating management information.

Yet another aspect of the disclosure is directed to a transmission apparatus for transmitting metadata relating to content via a network. The transmission apparatus may include means for storing the metadata including fragment updating management information in units of fragments, means for constructing a document from the metadata contained in a plurality of fragments excluding the fragment updating management information and generating a delivery unit including the document, means for compressing the metadata contained in the delivery unit, means for adding document updating management information to the compressed metadata contained in the delivery unit, and means for delivering the delivery unit containing the compressed metadata and the document updating management information.

Yet another aspect of the disclosure is directed to a transmission method for a transmission apparatus for transmitting metadata relating to content via a network. The transmission method may include storing the metadata including fragment updating management information in units of fragments, constructing a document from the metadata contained in a plurality of fragments excluding the fragment updating management information, generating a delivery unit including the document, compressing the metadata contained in the delivery unit, adding document updating management information to the compressed metadata contained in the delivery unit, and delivering the delivery unit containing the compressed metadata and the document updating management information.

Yet another aspect of the disclosure is directed to a computer-readable storage medium storing a computer program for transmitting metadata relating to content via a network which, when executed by a processor, causes a computer to perform a method. The method may include storing the metadata including fragment updating management information in units of fragments, constructing a document from the metadata contained in a plurality of fragments excluding the fragment updating management information, generating a delivery unit including the document, compressing the metadata contained in the delivery unit, adding document updating management information to the compressed metadata contained in the delivery unit, and delivering the delivery unit containing the compressed metadata and the document updating management information.

Yet another aspect of the disclosure is directed to a reception apparatus for receiving metadata relating to content via a network. The reception apparatus may include means for receiving compressed metadata contained in a delivery unit including a document constructed from metadata contained in a plurality of fragments excluding fragment updating management information, means for decompressing the received compressed metadata, means for storing the decompressed metadata, and means for copying the document updating management information contained in the delivery unit and assigning the document updating management information to the fragments as fragment updating management information.

Yet another aspect of the disclosure is directed to a reception method for a reception apparatus for receiving metadata relating to content via a network. The method may include receiving compressed metadata contained in a delivery unit including a document constructed from the metadata contained in a plurality of fragments excluding fragment updating management information, decompressing the received compressed metadata, storing the decompressed metadata, copying the document updating management information contained in the delivery unit, and assigning the document updating management information to the fragments as fragment updating management information.

Yet another aspect of the disclosure is directed to a computer-readable storage medium storing a computer program for receiving metadata relating to content via a network which, when executed by a processor, causes a computer to perform a method. The method may include receiving compressed metadata contained in a delivery unit including a document constructed from the metadata contained in a plurality of fragments excluding fragment updating management information, decompressing the received compressed metadata, storing the decompressed metadata, copying the document updating management information contained in the delivery unit, and assigning the document updating management information to the fragments as fragment updating management information.

Yet another aspect of the disclosure is directed to a transmission system. The transmission system may include a transmission apparatus which may be configured to transmit metadata relating to content via a network; and a reception apparatus which may be configured to receive the metadata transmitted from the transmission apparatus. The transmission apparatus may include a metadata storage section configured to store the metadata including fragment updating management information in units of fragments, a delivery-unit generating section configured to construct a document from the metadata contained in a plurality of fragments excluding the fragment updating management information and to generate a delivery unit including the document, a compression section configured to compress the metadata contained in the delivery unit, a document-updating-management-information adding section configured to add document updating management information to the compressed metadata contained in the delivery unit, and a delivering section configured to deliver via the network the delivery unit containing the compressed metadata and the document updating management information. The reception apparatus may include a reception section configured to receive the compressed metadata contained in the delivery unit, a decompression section configured to decompress the received compressed metadata, a storage section configured to store the decompressed metadata, and a copying section configured to copy the document updating management information contained in the delivery unit and assigning the document updating management information to the fragments as fragment updating management information.

Yet another aspect of the disclosure is directed to a transmission apparatus for transmitting metadata relating to content via a network. The transmission apparatus may include a metadata storage section configured to store the metadata including fragment updating management information in units of fragments, a delivery-unit generating section configured to construct a document from the metadata contained in a plurality of fragments excluding the fragment updating management information and to generate a delivery unit including the document, a compression means section configured to compress the metadata contained in the delivery unit, a document-updating-management-information adding section configured to add document updating management information to the compressed metadata contained in the delivery unit, and a delivering section configured to deliver the delivery unit containing the compressed metadata and the document updating management information.

Still yet another aspect of the disclosure is directed to a reception apparatus for receiving metadata relating to content via a network. The reception apparatus may include a reception section configured to receive compressed metadata contained in a delivery unit including a document constructed from the metadata contained in a plurality of fragments excluding fragment updating management information, a decompression section configured to decompress the received compressed metadata, a storage section configured to store the decompressed metadata, and a copying section configured to copy the document updating management information contained in the delivery unit and assigning the document updating management information to the fragments as fragment updating management information.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 4 illustrates a structure of a document before the delivery unit is constructed.

FIG. 5 illustrates a specific structure of the delivery unit.

FIG. 6 illustrates a structure of an extension schema.

FIG. 7 is a block diagram of a structure of a transmission system.

FIG. 17 illustrates a structure of a header of a file storing a metadata document.

FIG. 18 illustrates a structure of a header of a file storing a metadata document, to which updating management information is added.

DETAILED DESCRIPTION

Figure 1:
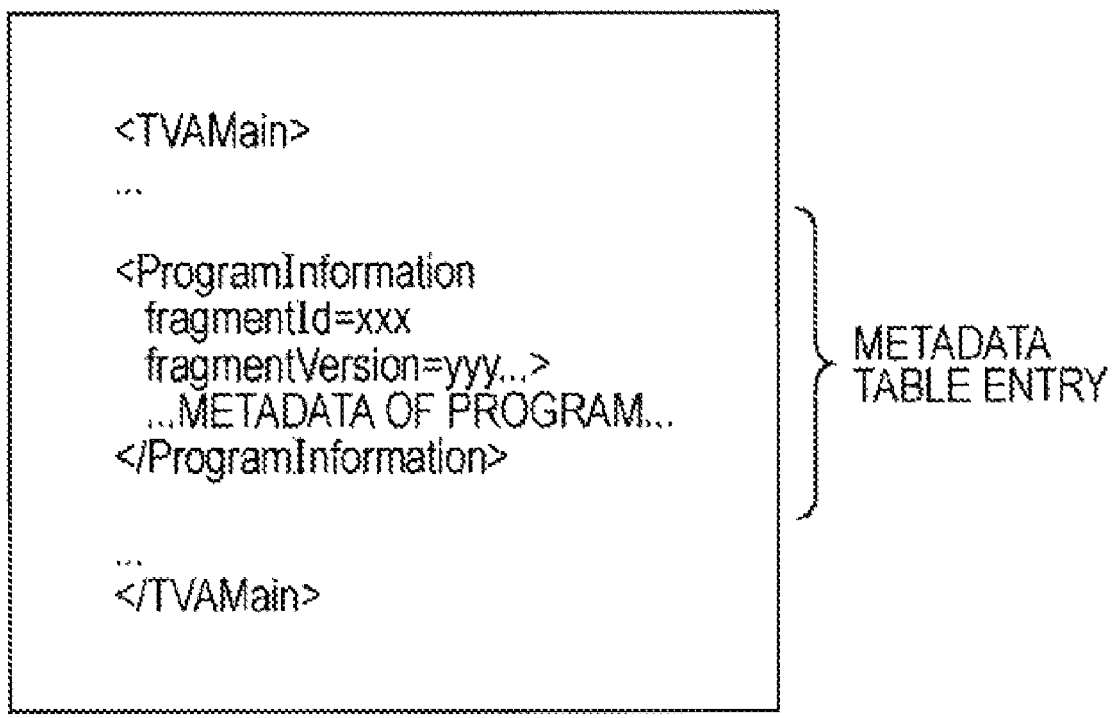
FIG. 1 illustrates a structure of a metadata table entry in the related art.
Figure 2:
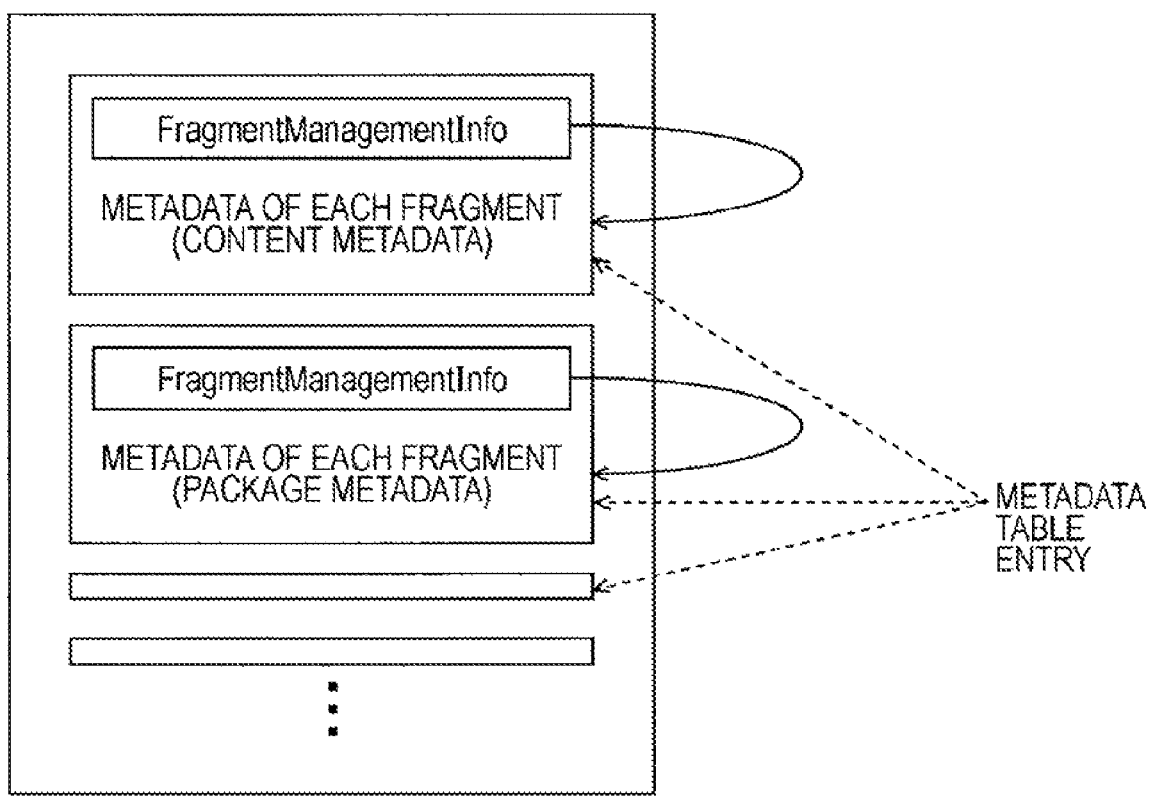
FIG. 2 illustrates a structure of a document in the related art.

Reference will now be made in detail to the present embodiments of the disclosure, examples of which are illustrated in the accompanying drawings. Wherever possible, the same reference numbers will be used throughout the drawings to refer to the same or like parts.

According to one aspect of the disclosure, there is provided a transmission system (e.g., a transmission system 31 shown in FIG. 7) which may include a transmission apparatus (e.g., a transmission apparatus 41 shown in FIG. 7) configured to transmit metadata relating to content via a network (e.g., a network 43 shown in FIG. 7), and a reception apparatus (e.g., a reception apparatus 42 shown in FIG. 7) which may be configured to receive the metadata transmitted from the transmission apparatus.

The transmission apparatus may include the following elements: storage means (e.g., a storage section 153 shown in FIG. 9) for storing the metadata to which fragment updating management information is added in units of fragments; generating means (e.g., a generation section 171 shown in FIG. 10) for constructing a document from the metadata contained in a plurality of fragments excluding the fragment updating management information and generating a delivery unit constituted of the document; means (e.g., a compression section 172 shown in FIG. 10) for compressing the metadata contained in the delivery unit; means (e.g., an adding section 173 shown in FIG. 10) for adding document updating management information to the compressed metadata contained in the delivery unit; and means (e.g., a delivery section 175 shown in FIG. 10) for delivering the delivery unit containing the compressed metadata and the document updating management information.

The reception apparatus may include the following elements: reception means (a reception section 201 shown in FIG. 11) for receiving the compressed metadata contained in the delivery unit; decompression means (e.g., a decompression section 202 shown in FIG. 11) for decompressing the received, compressed metadata contained in the delivery unit; storage means (e.g., a storage section 203 shown in FIG. 11) for storing the decompressed metadata contained in the delivery unit; and copying means (e.g., a copying section 204 shown in FIG. 11) for copying the document updating management information added to the compressed metadata contained in the delivery unit as the fragment updating management information of each of the fragments constructing the document.

The transmission apparatus may further include first means (e.g., an updating section 154 shown in FIG. 9) for updating the fragment updating management information in a case where the metadata is updated; and second means (e.g., an updating section 174 shown in FIG. 10) for updating, in a case where the document updating management information is added to each delivery unit, the fragment updating management information so that the fragment updating management information corresponds to the updated document updating management information.

The transmission apparatus may further include means (e.g., a generation section 151 shown in FIG. 9) for generating the metadata; and means (e.g., an adding section 152 shown in FIG. 9) for adding the fragment updating management information to the metadata in units of fragments.

Figure 3:
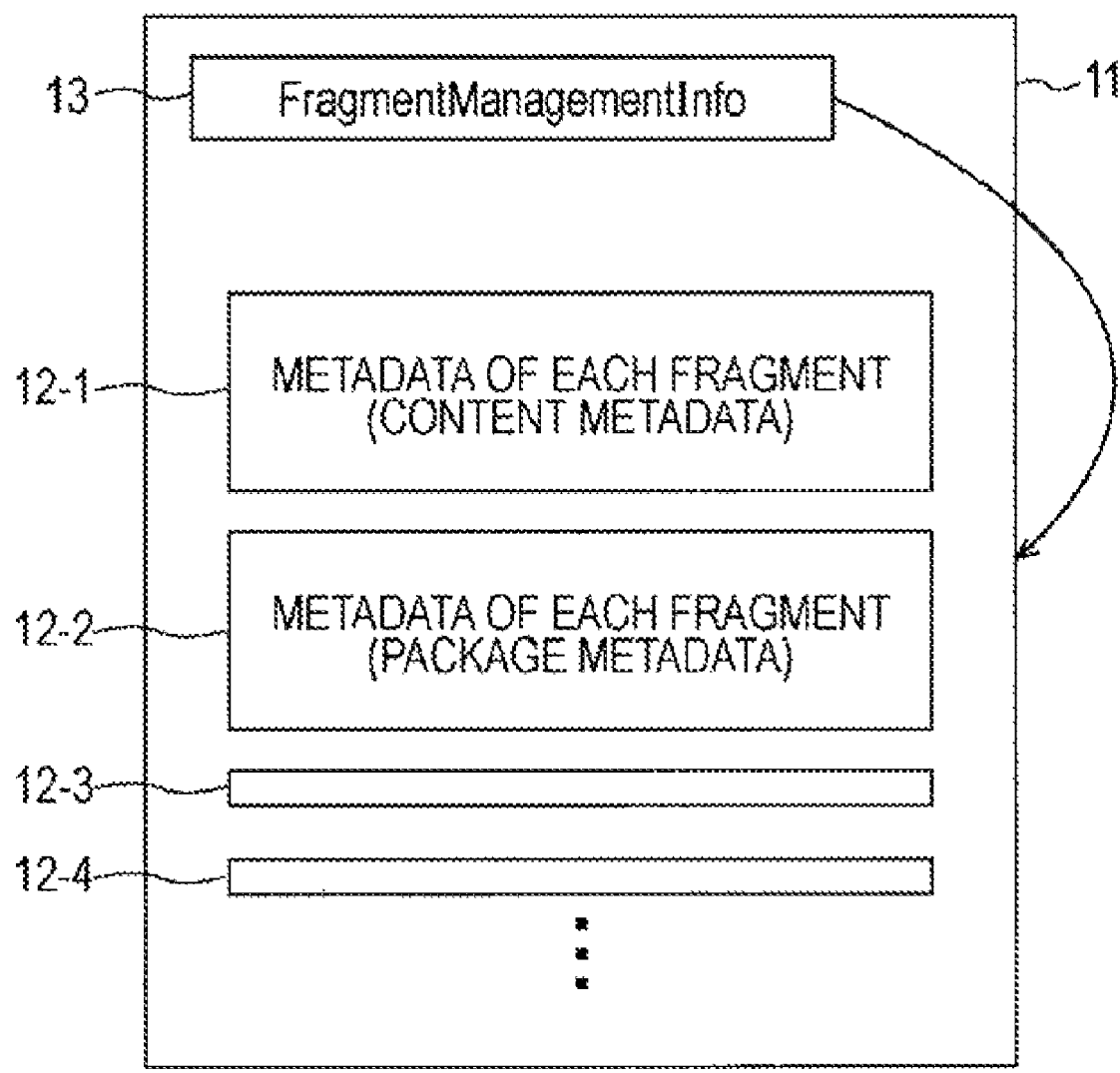
FIG. 3 illustrates a structure of a delivery unit.

FIG. 3 illustrates a data structure according to an aspect of the disclosure. A delivery unit 11 may consist of metadata table entries 12-1, 12-2, 12-3, 12-4, . . . corresponding to individual fragments. The metadata table entry 12-1 may contain no updating management information (fragment updating management information) which is unique thereto. Similarly, the metadata table entries 12-2, 12-3, 12-4, . . . contain no updating management information unique thereto. Updating management information (FragmentManagementInfo) 13 may be added to the delivery unit 11. The document updating management information 13 is not compressed and may remain as plain text. However, the metadata table entries 12-1, 12-2, 12-3, 12-4, . . . corresponding to the individual fragments may be compressed so that the entirety constitutes one item of data.

In this manner, updating management information that is unique to each fragment is not added to each fragment. Instead, one item of the updating management information 13 may be added to one delivery unit 11, and the delivery unit 11 may be transmitted via a network. This results in a smaller overhead and avoids wasting transmission bandwidth. Compression is not performed multiple times on a fragment-by-fragment basis (the number of times compression is performed corresponds to the number of fragments). Instead, compression may be performed only once on the entire delivery unit. Therefore, the load placed on a transmission apparatus 41 (described later with reference to FIG. 7) to perform compression may be reduced.

More specifically, a metadata server database 52 (described later with reference to FIG. 7) of the transmission apparatus 41 may store metadata based on, for example, syntax shown in FIG. 4. According to one aspect of the disclosure, metadata may be constituted of two fragments. The first fragment may correspond to metadata which may be sandwiched between the first tag <ProgramInformationTable> and the tag </ProgramInformationTable> and which may be titled "123". In the tag "ProgramInformation", ProgramId may be written as "crid://ca.com/123". Further, as fragment updating management information, the identifier "fragmentID" may be written as "0004", and the version "fragmentVersion" may be written as "v.02". The details of the metadata may be written from the tag <BasicDescription> to the tag </BasicDescription>.

The second fragment may correspond to metadata which may be sandwiched between the next tag <ProgramInformationTable> and the tag </ProgramInformationTable> and which may be titled "456". In the tag "ProgramInformation", ProgramId may be written as "crid://ca.com/456". Further, as fragment updating management information, the identifier "fragmentID" may be written as "0007", and the version "fragmentVersion" may be written as "v.05". The details of the metadata may be written from the tag <BasicDescription> to the tag </BasicDescription>.

Although not shown in FIG. 4, the generation date and effective period may be additionally written as the updating management information.

In order to transmit the metadata based on the syntax shown in FIG. 4 via a network 43 (described later with reference to FIG. 7), a delivery unit based on syntax shown in FIG. 5 may be used. Document updating management information of the delivery unit may be added to one document constituted of a plurality of fragments (the first fragment and the second fragment in the present embodiment). The identifier "fragmentID" of the document may be "0002", and the version "fragmentVersion" may be "v.08". In either of the first fragment and the second fragment, in the tag "ProgramInformation", programId may be written as "crid://ca.com/123" or "crid://ca.com/456". However, the fragment updating management information, namely, the identifier "fragmentID", such as "0004" or "0007" in FIG. 4, and the version "fragmentVersion", such as "v.02" or "v.05" in FIG. 4, is not written. The details of the metadata from the tag <BasicDescription> to the tag </BasicDescription> may contain the same details as those shown in FIG. 4.

FIG. 6 illustrates the syntax of an Extensible Markup Language (XML) schema for extending a TV-Anytime schema for constructing the syntax shown in FIG. 5. This is the extension schema which may allow the attribute (i.e., group) "fragmentIdentification", which may be updating management information of TV-Anytime metadata, to be usable as an attribute of the root element "TVAMain".

Referring to FIG. 6, schema xmlns:tva="urn:tva:metadata:2006/03" may represent a namespace for identifying the original TV-Anytime metadata; xmins="http://www.w3.org/2001/XMLSchema" may represent a namespace for identifying the XML schema; targetNamespace="urn:iptv" may represent the declaration that a newly defined schema is identified by "urn:iptv"; <complexType name="TVAMainType"> may represent the definition of TVAMainType, which is an extended root element; <extension base="tva: TVAMainType"> may represent specification of the original TV-Anytime original root element serving as the extension base; and <attributeGroup ref="tva:fragmentIdentification"/> may represent the definition of fragmentIdentification, which may be an attribute to be added.

FIG. 7 is a block diagram of a transmission system according to an aspect of the disclosure. A transmission system 31 may include the transmission apparatus 41 for transmitting content and its metadata and a reception apparatus 42 for receiving the content and metadata from the transmission apparatus 41 via the network 43.

Although only one reception apparatus 42 is shown in FIG. 7, multiple reception apparatuses may be connected to receive content and metadata transmitted from the transmission apparatus 41.

The network 43 may be a wired or wireless network or a combination of a wired network and a wireless network, which is partially constituted of the Internet.

The transmission apparatus 41, which may serve as an Internet Protocol Television (IPTV) server, may have the functional structure including a metadata generating unit 51, the metadata server database 52, a metadata delivering unit 53, and an IPTV media server 54.

The metadata generating unit 51 may generate metadata. The metadata server database 52 may store the metadata generated by the metadata generating unit 51. The metadata delivering unit 53 may transmit the metadata stored in the metadata server database 52 via the network 43 to the reception apparatus 42. The IPTV media server 54 may transmit content via the network 43 to the reception apparatus 42.

The reception apparatus 42, which may serve as an IPTV client terminal, may have the functional structure including a metadata receiving unit 61, a metadata client database 62, a user-interface processing unit 63, and an IPTV media client 64.

The metadata receiving unit 61 may receive metadata transmitted from the transmission apparatus 41 via the network 43. The metadata client database 62 may store the metadata received by the metadata receiving unit 61. The user-interface processing unit 63 may receive an instruction entered by a user. Based on the instruction sent from the user-interface processing unit 63, the IPTV media client 64 may receive content transmitted from the transmission apparatus 41 via the network 43 and may reproduce the content.

Figure 8:
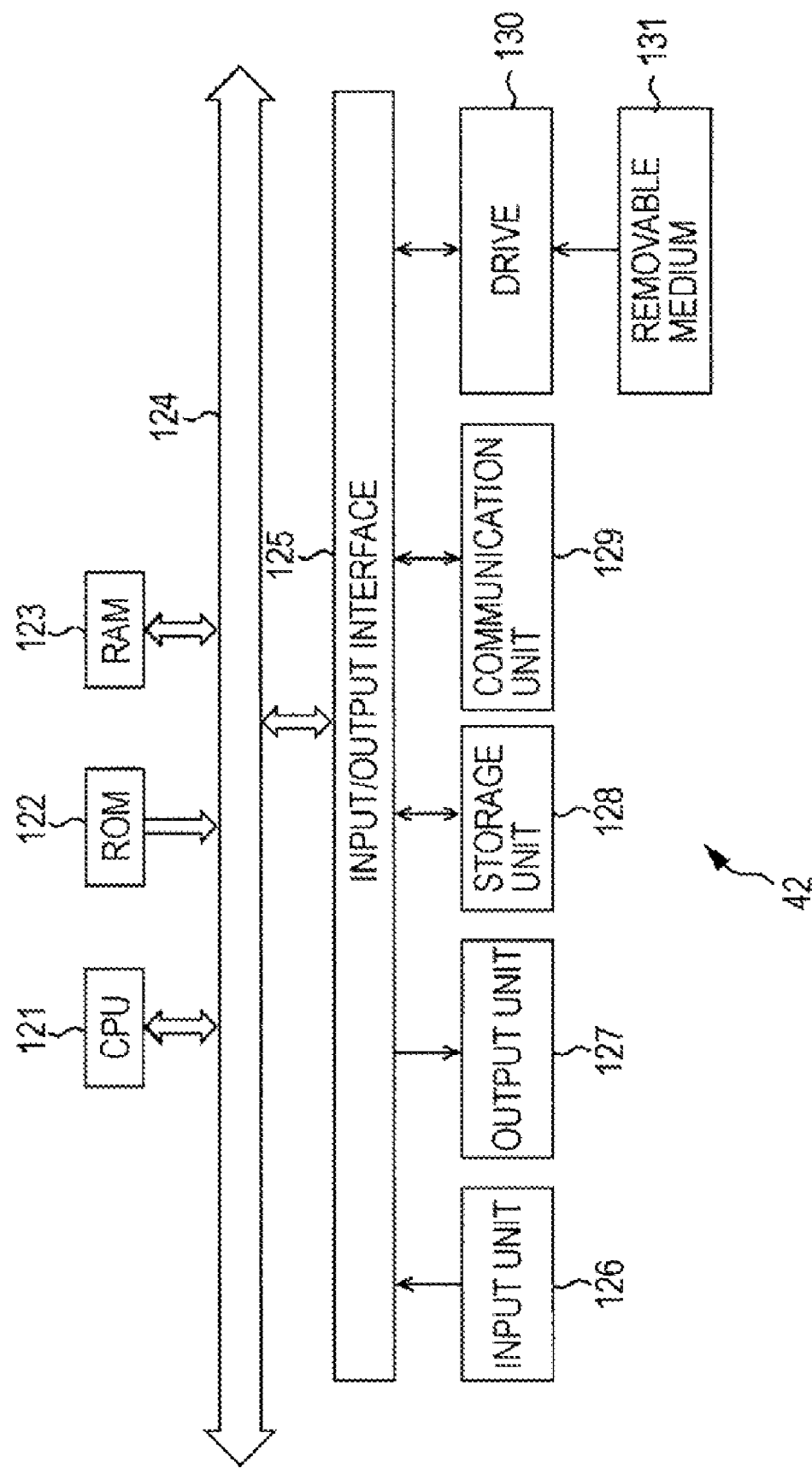
FIG. 8 is a block diagram of a structure of a reception apparatus.

FIG. 8 is a block diagram of a hardware structure of the reception apparatus 42 according to an aspect of the disclosure. A central processing unit (CPU) 121 may execute various processes in accordance with programs stored in a read-only memory (ROM) 122 or a storage unit 128. A random access memory (RAM) 123 may appropriately store a program executed by the CPU 121 and data. The CPU 121, the ROM 122, and the RAM 123 may be interconnected by a bus 124.

The CPU 121 may be connected to an input/output interface 125 via the bus 124. The input/output interface 125 may be connected to an input unit 126 including a keyboard, a mouse, and a microphone and an output unit 127 which may include a display and a loudspeaker. In response to instructions input from the input unit 126, the CPU 121 may execute various processes. The CPU 121 may output results of the processes to the output unit 127.

The storage unit 128 connected to the input/output interface 125 may be a computer-readable storage medium formed of, for example, a hard disk, and may store a program executed by the CPU 121 and various items of data. A communication unit 129 may communicate with an external device via the network 43. A program may be obtained via the communication unit 129 and may be stored in the storage unit 128.

When a removable medium 131, such as a magnetic disk, an optical disk, a magneto-optical disk, or a semiconductor memory is mounted to a drive 130 connected to the input/output interface 125, the drive 130 drives the removable medium 131 and may obtain a program and data recorded in the removable medium 131. If necessary, the obtained program and data may be transferred to and stored in the storage unit 128.

Although not shown in a drawing, the transmission apparatus 41 may have a hardware structure similar to that shown in FIG. 8.

Figure 9:
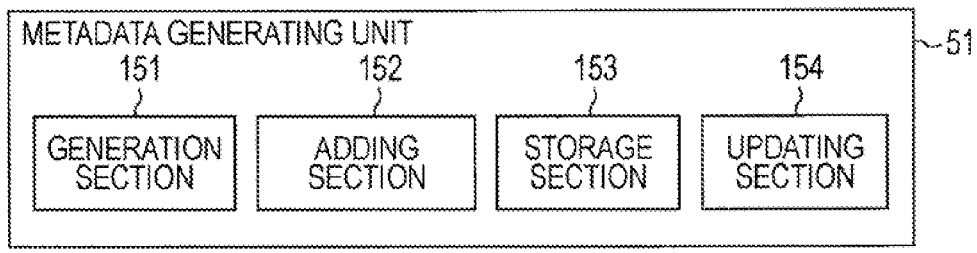
FIG. 9 is a block diagram of a functional structure of a metadata generating unit.

FIG. 9 illustrates the functional structure of the metadata generating unit 51. The metadata generating unit 51 may include a generation section 151, an adding section 152, a storage section 153, and an updating section 154.

The generation section 151 may generate metadata. The adding section 152 may add fragment updating management information to the metadata generated by the generation section 151. The storage section 153 may store the metadata including the additional updating management information. The updating section 154 may update stored metadata and updating management information.

Figure 10:
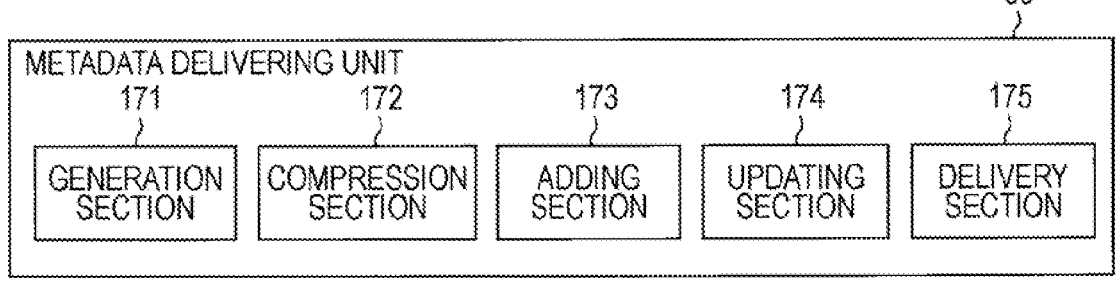
FIG. 10 is a block diagram of a functional structure of a metadata delivering unit.

FIG. 10 illustrates the functional structure of the metadata delivering unit 53. The metadata delivering unit 53 may include a generation section 171, a compression section 172, an adding section 173, an updating section 174, and a delivery section 175.

The generation section 171 may generate a delivery unit of metadata. The compression section 172 may compress metadata contained in the delivery unit generated by the generation section 171 to reduce the amount of data. The adding section 173 may add document updating management information to the delivery unit generated by the generation section 171. The updating section 174 may update the metadata contained in the delivery unit and the document updating management information added by the adding section 173. The delivery section 175 may transmit the delivery unit containing the compressed metadata and the additional updating management information to the reception apparatus 42 via the network 43.

Figure 11:
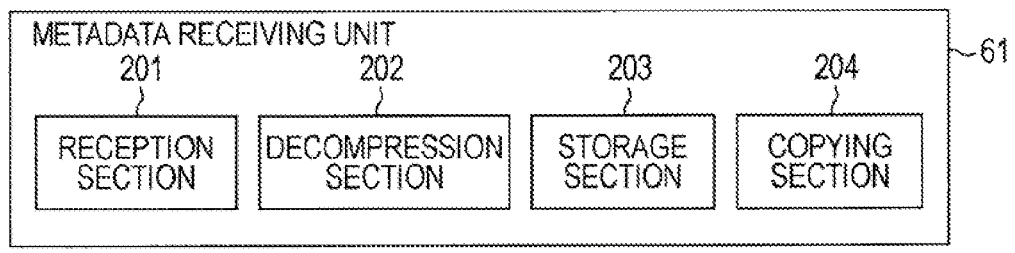
FIG. 11 is a block diagram of a functional structure of a metadata receiving unit.

FIG. 11 illustrates the functional structure of the metadata receiving unit 61. The metadata receiving unit 61 may include a reception section 201, a decompression section 202, a storage section 203, and a copying section 204.

The reception section 201 may receive metadata transmitted from the transmission apparatus 41 via the network 43. The decompression section 202 may decompress the compressed metadata received by the reception section 201. The storage section 203 may store the metadata decompressed by the decompression section 202. The copying section 204 may copy, for each fragment (each metadata table entry), document updating management information of the delivery unit as fragment updating management information.

Figure 12:
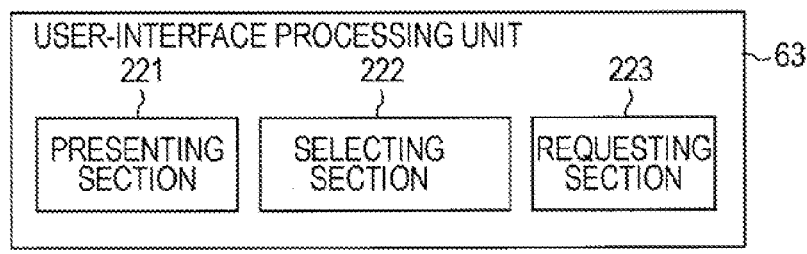
FIG. 12 is a block diagram of a functional structure of a user-interface processing unit.

FIG. 12 illustrates the functional structure of the user-interface processing unit 63. The user-interface processing unit 63 may include a presenting section 221, a selecting section 222, and a requesting section 223.

The presenting section 221 may present stored metadata to a user. The selecting section 222 may select content in response to an instruction entered by the user on the basis of the metadata. The requesting section 223 may request the transmission apparatus 41 via the IPTV media client 64 to reproduce the content selected by the selecting section 222.

Figure 13:
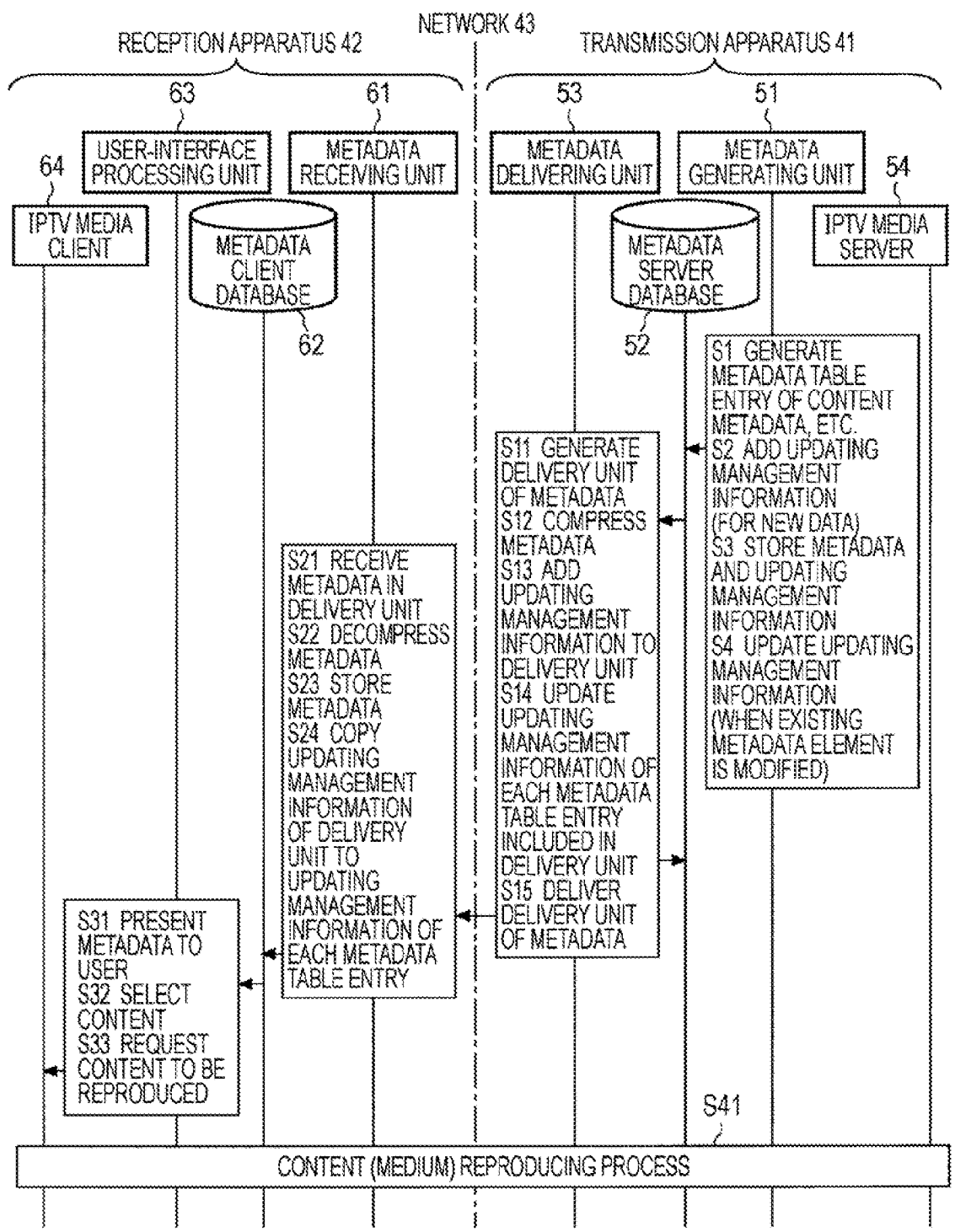
FIG. 13 is a flowchart of a metadata transmitting process.

Referring now to the flowchart shown in FIG. 13, a process of transmitting metadata from the transmission apparatus 41 to the reception apparatus 42, receiving the metadata at the reception apparatus 42, and receiving content based on the metadata at the reception apparatus 42 is described.

In the transmission apparatus 41, metadata may be generated and stored in the metadata server database 52 in the following manner.

More specifically, in step S1, the generation section 151 of the metadata generating unit 51 may generate a metadata table entry such as metadata relating to content stored in the IPTV media server 54. In this case, a metadata table entry of one fragment may be generated in association with one scene of the content. Accordingly, for example, information regarding the content, such as the title of the content, the name of an actor, and production date, may be written in the metadata table entry, specifically, between the tag <BasicDescription> and the tag </BasicDescription>. As a result, a content search can be conducted on metadata table entries using a specified keyword to retrieve content relating to the specified keyword.

In step S2, the adding section 152 may add updating management information (fragment updating management information) to the generated metadata. The updating management information may include, for example, the identifier of the fragment "fragmentID" and the fragment version "fragmentVersion".

In step S3, the storage section 153 may store the above-generated metadata and its updating management information in an associated manner. That is, the metadata and its associated updating management information may be stored on a fragment-by-fragment basis in the metadata server database 52.

In step S4, the updating section 154 may update the metadata stored in the metadata server database 52 if necessary. When the metadata is updated, the updating section 154 may further update the updating management information stored in the metadata server database 52. Accordingly, for example, the metadata version "fragmentVersion" may be updated to a new version.

In the foregoing manner, in the transmission apparatus 41, metadata relating to content stored in the IPTV media server 54 may be stored in the metadata server database 52.

The process up to this point is more specifically described with reference to FIG. 14.

When the generation section 151 of the metadata generating unit 51 generates content (x) of a metadata table entry X (step S1), the adding section 152 may add updating management information to the metadata table entry X (step S2). The storage section 153 may store the metadata table entry X with the additional updating management information in the metadata server database 52 (step S3). In FIG. 14, the version of the fragment updating management information may be "v.01". The fragment may correspond to one scene of that content.

Thereafter, when the updating section 154 updates the content (x) of the metadata table entry X to content (y), the version of the fragment updating management information may be updated from "v.01" to "v.02" (step S4).

Figure 14:
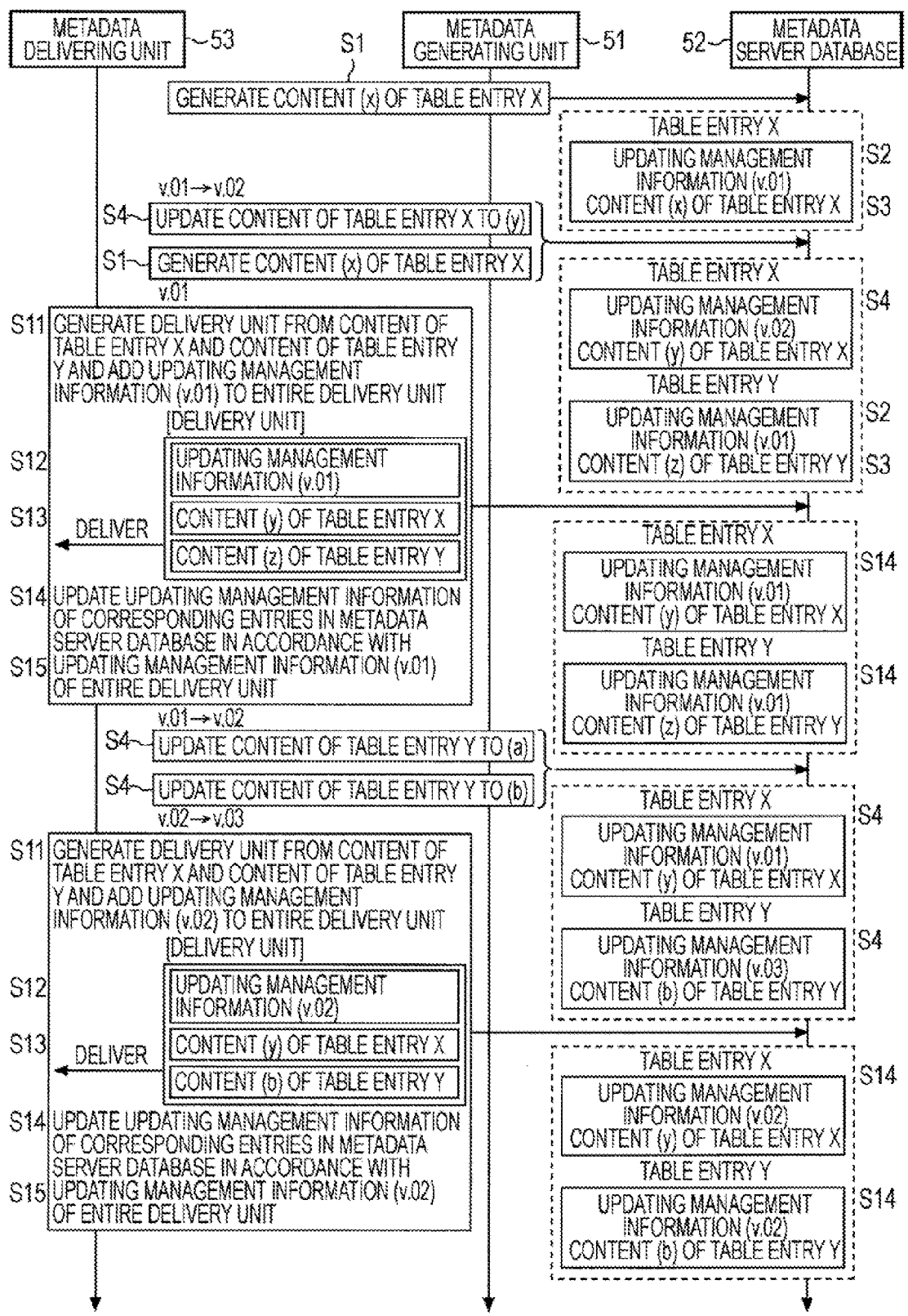
FIG. 14 is a flowchart of a process performed by a transmission apparatus.

With continued reference to FIG. 14, the generation section 151 may further generate content (z) of a metadata table entry Y (step S1), and the version thereof may be "v.01" (step S2). A fragment corresponding to the metadata table entry Y may be stored (step S3).

When the user of the reception apparatus 42 wants to view desired content, the user may access the transmission apparatus 41 via the network 43 and may enter a keyword relating to the content from the reception apparatus 42. The transmission apparatus 41 may search for metadata relating to the entered keyword from among items of metadata stored in advance in the metadata server database 52.

For example, when the user wants to receive content in which the user's favorite actor is playing, the user may enter the name of the actor as a keyword. The transmission apparatus 41 may search for fragments in which the name of the actor may be written from among items of metadata which may be stored in the metadata server database 52. In order to facilitate this search, the items of metadata may be stored in an uncompressed form.

The retrieved metadata may then be transmitted to the reception apparatus 42, as shown in FIG. 13.

In step S11, the generation section 171 of the metadata delivering unit 53 may generate a delivery unit of metadata. When it becomes necessary to deliver metadata, a delivery unit may be constructed of one or more fragments to be delivered. All fragments constructing a delivery unit may constitute one document.

In step S12, the compression section 172 may compress the metadata contained in the delivery unit to be transmitted. This compression is not performed on a fragment-by-fragment basis. Instead, fragments constituting one delivery unit may be compressed as one unit. This may result in a shorter compression time, compared with the case where compression is performed on a fragment-by-fragment basis. As a result, the load on the transmission apparatus 41 may be alleviated.

In step S13, the adding section 173 may add one item of document updating management information to one delivery unit (one document). In step S14, the updating section 174 may update the fragment updating management information of each of metadata table entries contained in the delivery unit. That is, the fragment updating management information of each of the fragments constituting the delivery unit may be updated using the document updating management information of the delivery unit. Accordingly, updating can be managed on a fragment-by-fragment basis, without transmitting items of fragment updating management information of the individual fragments, as if the fragment updating management information were transmitted.

In step S15, the delivery section 175 may deliver the metadata contained in the delivery unit. That is, the metadata may be transmitted to the reception apparatus 42 via the network 43. Since the metadata may be compressed in units of delivery units, the overhead may be reduced. This may result in a reduction in the amount of data and may avoid using a wide transmission band.

The foregoing delivery process is more specifically described with reference to FIG. 14.

When the generation section 171 of the metadata delivering unit 53 generates a delivery unit including the content (y) of the metadata table entry X and the content (z) of the metadata table entry Y (step S11), the compression section 172 may compress metadata contained in the delivery unit (step S12). The adding section 173 may add version "v0.1" as document updating management information to the delivery unit (step S13).

The updating section 174 may update the version of each of the fragment updating management information of the metadata table entry X and the metadata table entry Y constituting the delivery unit, which may be stored on a fragment-by-fragment basis in the metadata server database 52, to the version "v0.1" of the document updating management information of the delivery unit (step S14). Accordingly, the version of the metadata table entry X may be updated from "v.02" to "v.01". Since the version of the metadata table entry Y may originally be "v.01", the version of the metadata table entry Y may remain the same even though the version of the metadata table entry X may be updated.

The compressed content (y) of the metadata table entry X and the compressed content (z) of the metadata table entry Y to which the version "v.01" of the updating management information has been added may be transmitted as a delivery unit from the delivery section 175 to the reception apparatus 42 (step S15).

In FIG. 14, the updating section 154 may further update the content (z) of the metadata table entry Y to content (a), and may update the version from "v.01" to "v.02" (step S4). The updating section 154 may further update the content (a) of the metadata table entry Y to content (b), and may update the version from "v.02" to "v.03" (step S4). As a result, the content of the metadata table entry Y stored in the metadata server database 52 may be sequentially updated in the order of (z), (a), and (b), and the version may be sequentially updated in the order of "v.01", "v.02", and "v.03".

Further in this state, the generation section 171 of the metadata delivering unit 53 may generate a delivery unit including the content (y) of the metadata table entry X and the content (b) of the metadata table entry Y (step S11). The compression section 172 may compress the generated delivery unit (step S12). The adding section 173 may add the version "v.02" serving as document updating management information to the delivery unit (step S13). The updating section 174 may update the version from "v.01" to "v.02", which may serve as the updating management information of the metadata table entry X which has the content (y) and which may be stored in the metadata server database 52. Similarly, the version serving as the updating management information of the metadata table entry Y having the content (b) may be updated from "v.03" to "v.02" (step S14). The delivery section 175 may deliver the delivery unit (step S15).

In the foregoing manner, metadata may be delivered via the network 43. The reception apparatus 42 may receive the metadata as shown in FIG. 13.

In step S21, the reception section 201 of the metadata receiving unit 61 may receive metadata contained in the delivery unit. In step S22, the decompression section 202 may decompress compressed content in each of the metadata table entries. In step S23, the storage section 203 may store the decompressed content in each of the metadata table entries in the metadata client database 62.

In step S24, the copying section 204 may copy the document updating management information of the received delivery unit to fragment updating management information of each of the metadata table entries. Accordingly, the updating management information may be managed again in units of metadata table entries serving as fragments.

The foregoing reception process is described in more detail with reference to FIG. 15.

When the reception section 201 of the metadata receiving unit 61 receives the metadata table entry X having the content (y) and the metadata table entry Y having the content (z) serving as the delivery unit (step S21), the decompression section 202 may decompress the delivery unit (step S22). The storage section 203 may store the decompressed delivery unit in the metadata client database 62 (step S23). The copying section 204 may copy the version "v.01" serving as the document updating management information of the delivery unit as the version of the fragment updating management information of each of the metadata table entry X having the content (y) and the metadata table entry Y having the content (z) stored in the metadata client database 62 (step S24).

Figure 15:
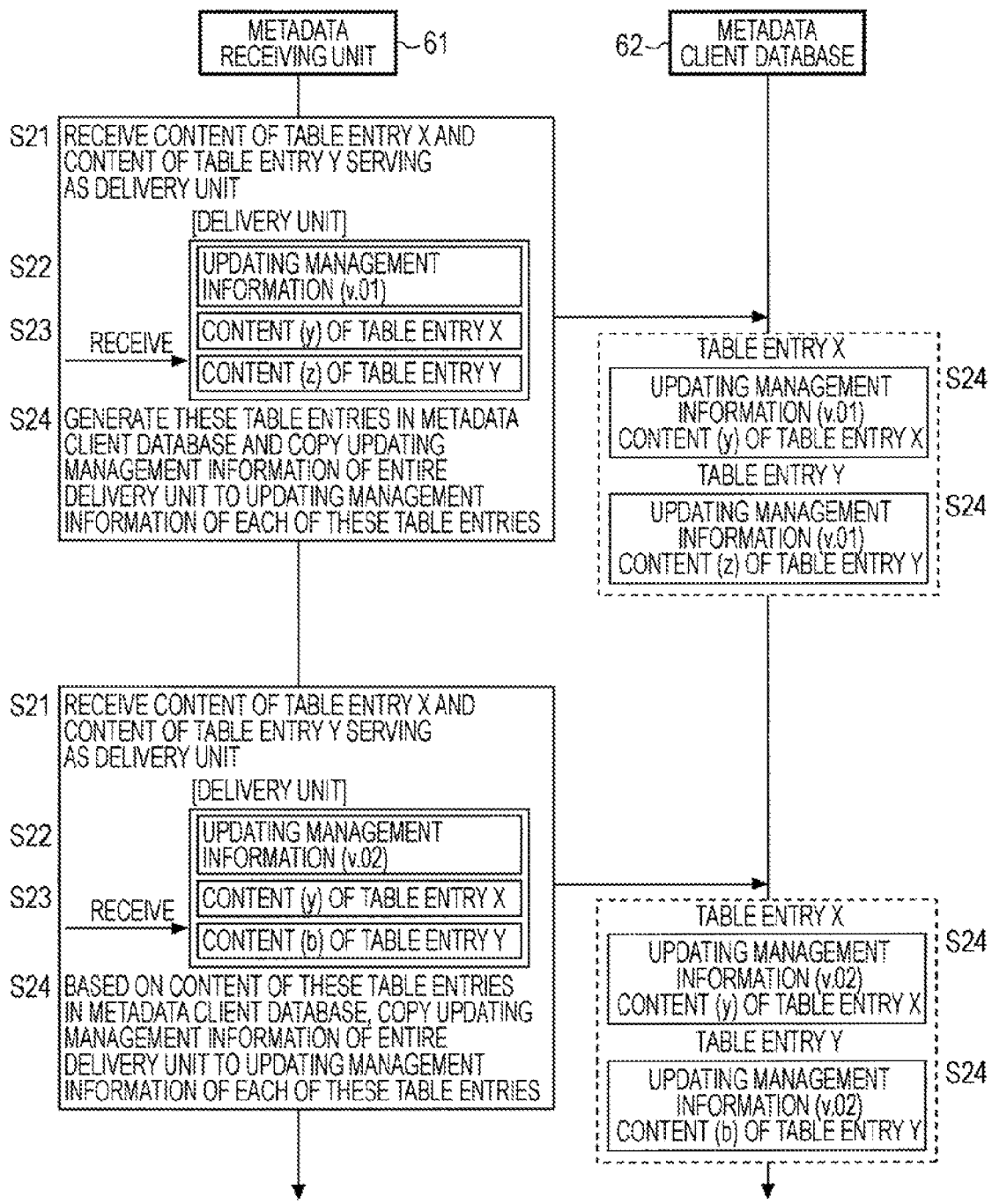
FIG. 15 is a flowchart of a process performed by the reception apparatus.

Accordingly, the version "v.01" of the fragment updating management information of the metadata table entry X having the content (y) stored in the metadata server database 52 of the transmission apparatus 41 (the version "v.01" of the metadata table entry X having the content (y) within the third dotted rectangle from the top in FIG. 14) can match the version "v.01" of the fragment updating management information of the metadata table entry X having the content (y) stored in the metadata client database 62 of the reception apparatus 42 (the version "v.01" of the metadata table entry X having the content (y) within the top dotted rectangle in FIG. 15).

Similarly, the version "v.01" of the fragment updating management information of the metadata table entry Y having the content (z) stored in the metadata server database 52 (the version "v.01" of the metadata table entry Y having the content (z) within the third dotted rectangle from the top in FIG. 14) can match the version "v.01" of the fragment updating management information of the metadata table entry Y having the content (z) stored in the metadata client database 62 of the reception apparatus 42 (the version "v.01" of the metadata table entry Y having the content (z) within the top dotted rectangle in FIG. 15).

Further, in FIG. 15, when the reception section 201 of the metadata receiving unit 61 receives the metadata table entry X having the content (y) and the metadata table entry Y having the content (b) serving as the delivery unit (step S21), the decompression section 202 may decompress the delivery unit (step S22). The storage section 203 may store the decompressed delivery unit in the metadata client database 62 (step S23). The copying section 204 may copy the version "v.02" serving as the document updating management information of the delivery unit as the version of the fragment updating management information of each of the metadata table entry X having the content (y) and the metadata table entry Y having the content (b) stored in the metadata client database 62 (step S24).

As a result, the version "v.02" of the updating management information of the metadata table entry X having the content (y) stored in the metadata server database 52 of the transmission apparatus 41 (the version "v.02" of the metadata table entry X having the content (y) within the bottom dotted rectangle in FIG. 14) can match the version "v.02" of the updating management information of the metadata table entry X having the content (y) stored in the metadata client database 62 of the reception apparatus 42 (the version "v.02" of the metadata table entry X having the content (y) within the bottom dotted rectangle in FIG. 15). Similarly, the version "v.02" of the updating management information of the metadata table entry Y having the content (b) stored in the metadata server database 52 (the version "v.02" of the metadata table entry Y having the content (b) within the bottom dotted rectangle in FIG. 14) can match the version "v.02" of the updating management information of the metadata table entry Y having the content (b) stored in the metadata client database 62 of the reception apparatus 42 (the version "v.02" of the metadata table entry Y having the content (b) within the bottom dotted rectangle in FIG. 15).

Thereafter, metadata table entries that have been transmitted at the same time in the foregoing manner in units of delivery units may be collectively updated at all times.

When the metadata is received by the reception apparatus 42 in the foregoing manner, the user may cause content information to be presented on the basis of the metadata, may select specific content on the basis of the presented information, and may cause the selected content to be reproduced. This operation is shown in FIG. 13.

That is, in step S31, in response to an instruction entered by the user, the presenting section 221 of the user-interface processing unit 63 may present metadata stored in the metadata client database 62. Accordingly, details of items of content described by the metadata may be presented to the user. On the basis of the presented information, the user may specify desired content to be reproduced.

In step S32, the selecting section 222 may select the content on the basis of the specification given by the user. In step S33, the requesting section 223 may request the IPTV media client 64 to reproduce the selected content.

In step S41, a session may be established via the network 43 between the IPTV media client 64 of the reception apparatus 42 and the IPTV media server 54 of the transmission apparatus 41. The IPTV media client 64 may request the IPTV media server 54 to reproduce the selected content. The IPTV media server 54 may transmit the stored content to the IPTV media client 64 via the network 43. The IPTV media client 64 may reproduce the received content. Accordingly, the user can view the specified content.

In the foregoing description, metadata requested by the user may be constructed as a delivery unit and may be delivered. Alternatively, predetermined metadata may be constructed and stored in advance as delivery units. In response to a request made by the user, one of the stored delivery units may be transmitted. In this case, the delivery unit may contain metadata undesired by the user. However, since metadata desired by the user may be fully contained in the delivery unit, there is no practical problem. Conversely, when part of metadata desired by the user is not contained in the delivery unit, a delivery unit that contains the largest amount of metadata desired by the user may be delivered.

Delivery units may be prepared on the basis of statistical results of requests made by a plurality of users so that the delivery units can contain metadata desired by many users.

In the foregoing aspect of the disclosure, updating management information may be added to the attribute of TVA-Main, which is a root element of a TV-Anytime metadata document. Alternatively, updating management information may be added to the header of a file storing a TV-Anytime metadata document.

Figure 16:
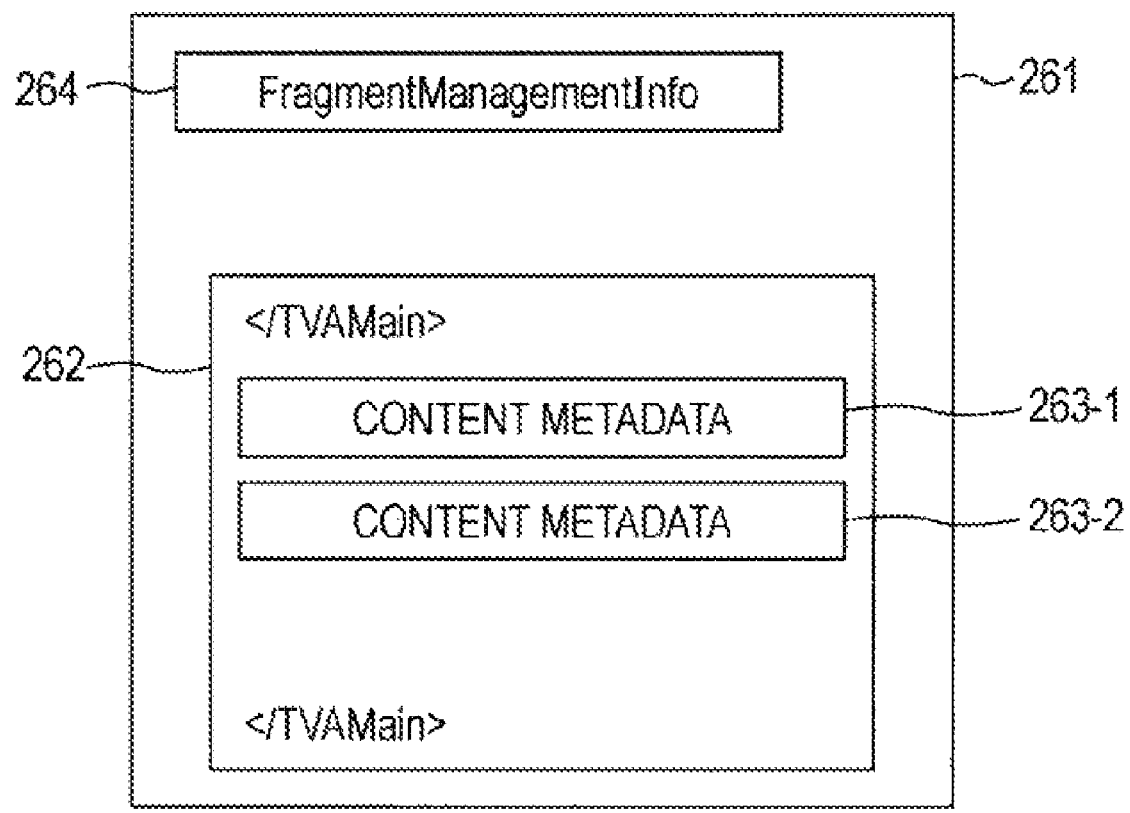
FIG. 16 illustrates another example of the structure of a delivery unit.

FIG. 16 illustrates a delivery unit in this case according to another aspect of the disclosure. A TV-Anytime metadata document 262 may include metadata table entries 263-1 and 263-2 of content. The metadata table entries 263-1 and 263-2 may be compressed. A file 261 storing the TV-Anytime metadata document 262 may serve as a delivery unit. Document updating management information, namely, "FragmentManagementInfo", of the metadata document 262 may be added to a header 264 of the file 261.

In this case, the reception apparatus 42 may receive the file 261 serving as the delivery unit from the transmission apparatus 41. Thereafter, the reception apparatus 42 may decompress the metadata table entries 263-1 and 263-2 and copy the document updating management information written in the header 264 as fragment updating management information of each of the metadata table entries 263-1 and 263-2.

FIG. 17 illustrates the data structure of the header of a file storing a TV-Anytime metadata document in this case.

Referring to FIG. 17, <schema xmlns:tva="urn:tva:metadata:2006/03" may represent a namespace for identifying the original TV-Anytime metadata; xmlns="http://www.w3.org/2001/XMLSchema" may represent a namespace for identifying the XML schema; targetNamespace="urn:iptv" may represent the declaration that a newly defined schema is identified by "urn:iptv"; <complexType name="MetadataEncapsulationType"> may represent the definition of the header of a file storing the TV-Anytime metadata document; <element base="tva: TVAMainType"> may represent a TV-Anytime root element; and <attributeGroup ref="tva:fragmentIdentification"/> may represent the definition of fragmentIdentification, which may be an attribute to be added.

FIG. 18 illustrates a specific example of the header of a file storing a TV-Anytime metadata document, which has the data structure based on the schema shown in FIG. 17, to which updating management information may be added.

Referring to FIG. 18, <MetadataEncapsulationType fragmentId="0002" fragmentVersion="v.08"> may represent document updating management information; fragmentId="0002" may represent the identifier for identifying the document; and fragmentVersion="v.08" may represent the version of the document.

There may be two metadata table entries. The first metadata table entry may contain metadata whose programID is "crid://ca.com/123" and whose content is titled "123". The second metadata table entry may contain metadata whose programID is "crid://ca.com/456" and whose content is titled "456".

When document updating management information is written in the header of a file, as has been described above, similar advantages can be achieved as in the case where document updating management information is written as an attribute of a metadata document.

The series of processes described herein can be executed by hardware or software. When the series of processes is executed by software, a program implementing the software may be installed from a computer-readable storage medium into a computer embedded in dedicated hardware or a general-purpose computer that is capable of executing various processes using various programs installed therein.

The computer-readable storage medium storing the program to be installed into and executed by a computer may include, as shown in FIG. 8, the removable medium 131, which is a packaged medium including a magnetic disk (including a flexible disk), an optical disk (including a compact disc read-only memory (CD-ROM), a digital versatile disc (DVD), and the like), a magneto-optical disk, or a semiconductor memory, the ROM 122 temporarily or permanently storing the program, or a hard disk constituting the storage unit 128. The program can be stored on the computer-readable storage medium using a wired or wireless communication medium, such as a local area network (LAN), the Internet, or digital satellite broadcasting, via the communication unit 129, which is an interface such as a router or a modem, if necessary.

The steps describing the program in this specification may be executed time sequentially according to the description, or may be executed in parallel or individually.

The term "system" in this specification is a logical set of a plurality of apparatuses.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

It is to be appreciated that one skilled in the art will realize that the processes illustrated in this description may be implemented in a variety of ways and may include multiple other modules, programs, applications, scripts, processes, threads, or code sections that may all functionally interrelate with each other to accomplish the individual tasks described above. Such modules, programs, applications, scripts, processes, threads, or code sections based on the written description and methods of this invention are within the skill of an experienced developer. The various modules, programs, applications, scripts, processes, threads, or code sections can be created using any of the techniques known to one skilled in the art or can be designed in connection with existing software.

It should be understood by those skilled in the art that various modifications, combinations, sub-combinations, and alterations may occur depending on design requirements and other factors insofar as they are within the scope of the appended claims or the equivalents thereof. The steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A transmission system comprising:
   a transmission apparatus that transmits metadata relating to content via a network; and
   a reception apparatus that receives the metadata transmitted from the transmission apparatus;
   wherein the transmission apparatus includes a computer-readable storage medium comprising instructions that, when executed, perform the steps of:
   storing the metadata including fragment updating management information in units of fragments;
   constructing a document from the metadata contained in a plurality of fragments excluding the fragment updating management information and for generating a delivery unit including the document;
compressing the metadata contained in the delivery unit;
adding document updating management information to the compressed metadata contained in the delivery unit, wherein the document updating management information comprises the fragment updating management information of each of the fragments constructing the document; and
delivering via the network the delivery unit containing the compressed metadata and the document updating management information; and
wherein the reception apparatus includes a computer-readable storage medium comprising instructions that, when executed, perform the steps of:
receiving the compressed metadata contained in the delivery unit;
decompressing the received compressed metadata;
storing the decompressed metadata; and
copying the document updating management information contained in the delivery unit and assigning the document updating management information to the fragments as fragment updating management information.

2. A transmission method for a transmission system for transmitting metadata relating to content from a transmission apparatus to a reception apparatus via a network, the method comprising:
using the transmission apparatus to perform steps comprising:
storing the metadata including fragment updating management information in units of fragments;
constructing a document from the metadata contained in a plurality of fragments excluding the fragment updating management information;
generating a delivery unit including the document;
compressing the metadata contained in the delivery unit;
adding document updating management information to the compressed metadata contained in the delivery unit, wherein the document updating management information comprises the fragment updating management information of each of the fragments constructing the document; and
delivering, via the network, the delivery unit containing the compressed metadata and the document updating management information; and
using the reception apparatus to perform steps comprising:
receiving the compressed metadata contained in the delivery unit;
decompressing the received compressed metadata;
storing the decompressed metadata;
copying the document updating management information contained in the delivery unit; and
assigning the document updating management information to the fragments as fragment updating management information.

3. A transmission apparatus for transmitting metadata relating to content via a network, comprising a computer-readable storage medium comprising instructions that, when executed, perform the steps of:
storing the metadata including fragment updating management information in units of fragments;
constructing a document from the metadata contained in a plurality of fragments excluding the fragment updating management information and generating a delivery unit including the document;
compressing the metadata contained in the delivery unit;
adding document updating management information to the compressed metadata contained in the delivery unit wherein the document updating management information cam rises the fragment updating management information of each of the fragments constructing the document; and
delivering the delivery unit containing the compressed metadata and the document updating management information.

4. The transmission apparatus according to claim 3, further comprising the steps of:
updating the fragment updating management information when the metadata is updated; and
updating, when the document updating management information is added to each delivery unit, the fragment updating management information so that the fragment updating management information corresponds to the document updating management information.

5. The transmission apparatus according to claim 3, further comprising the steps of:
generating the metadata; and
adding the fragment updating management information to the metadata in units of fragments.

6. A transmission method for a transmission apparatus for transmitting metadata relating to content via a network, the transmission apparatus performing steps comprising:
storing the metadata including fragment updating management information in units of fragments;
constructing a document from the metadata contained in a plurality of fragments excluding the fragment updating management information;
generating a delivery unit including the document;
compressing the metadata contained in the delivery unit;
adding document updating management information to the compressed metadata contained in the delivery unit, wherein the document updating management information comprises the fragment updating management information of each of the fragments constructing the document; and
delivering the delivery unit containing the compressed metadata and the document updating management information.

7. A computer-readable storage medium storing a computer program for transmitting metadata relating to content via a network which, when executed by a processor, causes a computer to perform a method comprising:
storing the metadata including fragment updating management information in units of fragments;
constructing a document from the metadata contained in a plurality of fragments excluding the fragment updating management information;
generating a delivery unit including the document;
compressing the metadata contained in the delivery unit;
adding document updating management information to the compressed metadata contained in the delivery unit, wherein the document updating management information comprises the fragment updating management information of each of the fragments constructing the document; and
delivering the delivery unit containing the compressed metadata and the document updating management information.

8. A reception apparatus for receiving metadata relating to content via a network, comprising a computer-readable storage medium comprising instructions that, when executed, perform the steps of:
receiving compressed metadata contained in a delivery unit including a document constructed from metadata contained in a plurality of fragments excluding fragment updating management information;
decompressing the received compressed metadata;
storing the decompressed metadata; and copying document updating management information contained in the delivery unit and assigning the document updating management information to the fragments as fragment updating management information.

9. A reception method for a reception apparatus for receiving metadata relating to content via a network, the reception apparatus performing steps comprising:
receiving compressed metadata contained in a delivery unit including a document constructed from the metadata contained in a plurality of fragments excluding fragment updating management information;
decompressing the received compressed metadata;
storing the decompressed metadata;
copying document updating management information contained in the delivery unit, wherein the document updating management information comprises the fragment updating management information of each of the fragments constructing the document; and
assigning the document updating management information to the fragments as fragment updating management information.

10. A computer-readable storage medium storing a computer program for receiving metadata relating to content via a network which, when executed by a processor, causes a computer to perform a method comprising:
receiving compressed metadata contained in a delivery unit including a document constructed from the metadata contained in a plurality of fragments excluding fragment updating management information;
decompressing the received compressed metadata;
storing the decompressed metadata;
copying document updating management information contained in the delivery unit, wherein the document updating management information comprises the fragment updating management information of each of the fragments constructing the document; and
assigning the document updating management information to the fragments as fragment updating management information.

11. A transmission system comprising:
a transmission apparatus that transmits metadata relating to content via a network; and
a reception apparatus that receives the metadata transmitted from the transmission apparatus;
wherein the transmission apparatus includes a computer-readable storage medium comprising:
a metadata storage section that stores the metadata including fragment updating management information in units of fragments;
a delivery-unit generating section that constructs a document from the metadata contained in a plurality of fragments excluding the fragment updating management information and to generate a delivery unit including the document;
a compression section that compresses the metadata contained in the delivery unit;
a document updating management information adding section that adds document updating management information to the compressed metadata contained in the delivery unit, wherein the document updating management information comprises the fragment updating management information of each of the fragments constructing the document; and
a delivering section that delivers via the network the delivery unit containing the compressed metadata and the document updating management information; and wherein the reception apparatus includes a computer-readable storage medium comprising:
a reception section that receives the compressed metadata contained in the delivery unit;
a decompression section that decompresses the received compressed metadata;
a storage section that stores the decompressed metadata; and
a copying section that copies the document updating management information contained in the delivery unit and assigns the document updating management information to the fragments as fragment updating management information.

12. A transmission apparatus for transmitting metadata relating to content via a network, comprising a computer-readable storage medium comprising:
a metadata storage section that stores the metadata including fragment updating management information in units of fragments;
a delivery unit generating section that constructs a document from the metadata contained in a plurality of fragments excluding the fragment updating management information and to generate a delivery unit including the document;
a compression section that compresses the metadata contained in the delivery unit;
a document updating management information adding section that adds document updating management information to the compressed metadata contained in the delivery unit, wherein the document updating management information comprises the fragment updating management information of each of the fragments constructing the document; and
a delivering section that delivers the delivery unit containing the compressed metadata and the document updating management information.

13. A reception apparatus for receiving metadata relating to content via a network, comprising a computer-readable storage medium comprising:
a reception section that receives compressed metadata contained in a delivery unit including a document constructed from the metadata contained in a plurality of fragments excluding fragment updating management information;
a decompression section that decompresses the received compressed metadata;
a storage section that stores the decompressed metadata; and
a copying section that copies document updating management information contained in the delivery unit and assigns the document updating management information to the fragments as fragment updating management information.

14. The transmission system of claim 1, wherein the fragment updating management information comprises the identifier of the fragment and the fragment version.

15. The transmission system of claim 1, wherein the delivery unit comprises:
metadata table entries corresponding to individual fragments, wherein the metadata table entries do not contain updating management information that is unique to an entry; and
the document updating management information.

16. The transmission system of claim 15, wherein the document updating management information is not compressed.

* * * * *